United States Patent
Maeda et al.

(10) Patent No.: US 6,329,092 B1
(45) Date of Patent: Dec. 11, 2001

(54) POLYMER ELECTROLYTE FUEL CELL AND SYSTEMS THEREFOR

(75) Inventors: Hideo Maeda; Hisatoshi Fukumoto; Kenro Mitsuda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/336,702

(22) Filed: Jun. 21, 1999

(30) Foreign Application Priority Data

Oct. 2, 1998 (JP) .................................................. 10-281457

(51) Int. Cl.$^7$ .............................. H01M 8/06; H01M 8/10; H01M 4/86
(52) U.S. Cl. .................................. 429/23; 429/30; 429/40
(58) Field of Search .................................. 429/23, 24, 30, 429/40

(56) References Cited

U.S. PATENT DOCUMENTS

| | | | |
|---|---|---|---|
| 5,945,229 | * | 8/1999 | Meltser et al. .......................... 429/23 |
| 6,063,516 | * | 5/2000 | Grot et al. ............................... 429/23 |

FOREIGN PATENT DOCUMENTS

| | | |
|---|---|---|
| 1305212 | 7/1992 | (CA) . |
| 7-105967 | 4/1995 | (JP) . |
| 8-293312 | 5/1996 | (JP) . |

\* cited by examiner

*Primary Examiner*—Nam Nguyen
*Assistant Examiner*—Gregg Cantelmo
(74) *Attorney, Agent, or Firm*—Oblon, Spivak, McClelland, Maier & Neustadt, P.C.

(57) ABSTRACT

A polymer electrolyte fuel cell comprises a main stack alternately stacked with cells each provided with gas-diffusing electrodes on both sides of an ion-conducting electrolyte membrane and gas separators for supplying fuel to one of the electrodes and oxidant gas to the other electrode on each of the cells, and an auxiliary stack alternately stacked with the cells and the gas separators, the auxiliary stack having a lesser number of cells and gas separators than the main stack and having an independent current path from the main stack, wherein fuel and oxidant gas are supplied to the main stack after passing through the auxiliary stack, and wherein the load on the auxiliary stack is controlled. The load on the auxiliary stack is additionally controlled such that the electric potential of the fuel electrodes of the auxiliary stack exceeds the electric potential of the oxidation of carbon monoxide, whereby the voltage per layer of cell in the auxiliary stack continuously oscillates.

12 Claims, 7 Drawing Sheets

POLYMER ELECTROLYTE FUEL CELL AND SYSTEMS THEREFOR

BACKGROUND OF THE INVENTION

1. Field of the Invention

The present invention relates to a polymer electrolyte fuel cell for generating electricity using an electrochemical reaction for use in an electric automobile, for example, and to systems therefor.

2. Description of the Related Art

As is well known, fuel cells are typical electrochemical devices in which chemical energy is converted directly to electric energy by placing a pair of electrodes in contact by means of an electrolyte, supplying fuel to one of the electrodes and an oxidant to the other electrode, and allowing the electrochemical oxidation of the fuel to proceed within the cell.

There are several types of fuel cell depending on the electrolyte used, but in recent years polymer electrolyte fuel cells using polymer electrolyte membrane as an electrolyte have attracted attention as fuel cells providing high output.

In a fuel cell, when hydrogen gas is supplied to the fuel electrode and oxygen gas is supplied to the oxidant electrode and electric current is removed by an external circuit, the following reactions occur:

Fuel electrode reaction: $H_2 \rightarrow 2H^+ + 2e^-$ (1)

Oxidant electrode reaction: $2H^+ + 2e^- + \frac{1}{2}O_2 \rightarrow H_2O$ (2)

If catalysts such as platinum, etc., on the electrodes work effectively, the reactions proceeds smoothly with hardly any overvoltage occurring in the above reaction (1).

However, when hydrocarbons such as methanol, etc., which are easy to handle are used as the fuel, the fuel is first reformed to hydrogen in a reformer by a reaction such as reaction (3) below.

Reforming reaction: $CH_3OH + H_2O \rightarrow 3H_2 + CO_2$ (3)

However, trace quantities of carbon monoxide may contaminate the fuel due to the shift reaction (4) given below.

Shift reaction: $CO_2 + H_2 \rightarrow CO + H_2O$ (4)

One problem, particularly in electrochemical devices such as polymer electrolyte fuel cells which have a low operating temperature, is that the catalyst can be poisoned by the presence of a few tens of parts per million of carbon monoxide, lowering performance by increasing overvoltage from the reaction at the fuel electrode (anode).

Thus, in order to reduce the effects of carbon monoxide poisoning, many adaptations have been conventionally adopted. They basically fall into: the development of catalytic compositions less affected by carbon monoxide; and the development of methods for selectively removing carbon monoxide from the fuel.

Retention of high performance at carbon monoxide concentrations of up to 100 ppm has been reported for catalytic compositions using alloys of platinum (Pt) and ruthenium (Ru). ("Behavior of CO Poisoning on Electrocatalysts for Polymer Electrolyte Fuel Cell", Keynote Lectures of the Thirty-Fifth Battery Symposium in Japan, 3D19, pp 299 to 300 (1994))

Furthermore, reports of methods for selectively removing carbon monoxide from fuel include a method for removal by the addition of air into the catalyst layer (Canadian Patent No. 1,305,212), a method for introducing trace quantities of air into the fuel of a fuel cell ("Performance of Polymer Electrolyte Fuel Cells with Three Dimensional Bonding Method", Keynote Lectures of the Thirty-Sixth Battery Symposium in Japan, 1C07, pp 225 to 226 (1995)), etc.

In selective oxidation by the introduction of air in this manner, it has been confirmed that by oxidizing the carbon monoxide in the fuel carbon monoxide concentrations can be reduced to levels which do not cause poisoning.

However, when the carbon monoxide concentration is high, even the performance of Pt-Ru alloys is unstable, and so improvements in catalytic composition are still insufficient as a countermeasure to poisoning.

Furthermore, shortcomings remain in selective oxidation by the introduction of air, such as large amounts of hydrogen being simultaneously consumed by combustion, or performance being reduced by dilution of the fuel gas due to nitrogen being the major component of air, or corrosion occurring in the cell elements due to hydrogen gas being rarefied by the residence of inert gas.

Furthermore, if the amount of air is too small, carbon monoxide is not removed sufficiently, making it important to control the amount of air in response to the amount of fuel and the concentration of carbon monoxide, but control has been difficult because there has been no easy way to ascertain the concentration of carbon monoxide.

Now, Japanese Patent Laid-Open No HEI 7-105967 describes the construction of a fuel cell in which a carbon monoxide-removing fuel cell is disposed in a fuel supply passage of a main fuel cell, and a fuel discharge passage from the carbon monoxide-removing fuel cell is connected to the fuel supply passage of the main fuel cell.

Reformed gas composed mainly of hydrogen is first supplied to the carbon monoxide-removing fuel cell and hydrogen fuel is consumed by the above reaction (1), but carbon monoxide contained in this fuel simultaneously adsorbs onto the catalyst on the fuel electrode. At the same time, the above reaction (2) is performed at the oxidant electrode by supplying oxygen, the amount of oxygen passing through the electrolyte membrane and reaching the fuel electrode on the other side being controlled by adjusting the oxygen supply pressure. The following oxidation reaction (5) occurs on the fuel electrode, and since the poisoning carbon monoxide adsorbed onto the fuel electrode is removed by desorption as carbon dioxide, only the trace quantities of carbon monoxide remaining after adsorption and removal in the carbon monoxide-removing fuel cell are introduced into the main fuel cell.

Oxidation reaction: $CO + \frac{1}{2}O_2 \rightarrow CO_2$ (5)

However, this still leaves the problem of loss of current generating efficiency due to a portion of the hydrogen in the fuel being consumed by reaction with oxygen at the same time as the oxidation reaction (5) occurs. Another problem is that extra power is required to provide the pressure to make the oxygen pass through.

SUMMARY OF THE INVENTION

The present invention aims to solve the above problems and an object of the present invention is to prevent reductions in performance of a fuel cell due to poisoning of the catalyst, etc., while suppressing the reduction of the current generating efficiency thereof According to a first construction of the present invention, there is provided a polymer electrolyte fuel cell comprising:
a main stack alternately stacked with cells each provided with gas-diffusing electrodes on both sides of an ion-conducting electrolyte membrane and gas separators for supplying fuel to one of the electrodes and oxidant gas to the other electrode on each of the cells; and an auxiliary stack alternately stacked with the cells and gas separators, the auxiliary stack having a lesser number of cells and gas separators than the main stack and having an independent current path from the main stack, wherein the fuel and the oxidant gas are supplied to the main stack after passing through the auxiliary stack, and wherein the load on the auxiliary stack is controlled.

According to a second construction of the present invention, in addition to the first construction, the load on the auxiliary stack of a polymer electrolyte fuel cell may also be controlled such that the voltage per layer of cell in the auxiliary stack continuously oscillates so that the electric potential of one of the electrodes of the auxiliary stack exceeds the electric potential of the oxidation of carbon monoxide.

According to a third construction of the present invention, in addition to the second construction, the temperature of the auxiliary stack of a polymer electrolyte fuel cell may also be reduced below the temperature of the main stack.

According to a fourth construction of the present invention, there is provided a polymer electrolyte fuel cell system comprising:

the polymer electrolyte fuel cell according to either the second or third construction above; and a reformer disposed at a stage prior to the polymer electrolyte fuel cell, the reformer being provided with a reforming portion for reforming hydrocarbons into a fuel having hydrogen as its main component and a carbon monoxide-selective oxidizing portion for oxidizing carbon monoxide in the fuel by supplying air thereto, wherein the concentration of carbon monoxide in the fuel supplied to the auxiliary stack is estimated from at least one of the current in the auxiliary stack, the temperature of the auxiliary stack, and the voltage frequency per layer of cell in the auxiliary stack, and at least one of the air supply to the carbon monoxide-selective oxidizing portion and the temperature of the carbon monoxide-selective oxidizing portion is controlled in response to the estimated concentration of carbon monoxide.

According to a fifth construction of the present invention, there is provided a polymer electrolyte fuel cell system comprising:

the polymer electrolyte fuel cell according to either the second or third construction above; and a reformer disposed at a stage prior to the polymer electrolyte fuel cell, the reformer being provided with a reforming portion for reforming hydrocarbons into a fuel having hydrogen as its main component and a carbon monoxide-selective oxidizing portion for oxidizing carbon monoxide in the fuel by supplying air thereto, wherein the change in concentration of carbon monoxide in the fuel supplied to the auxiliary stack after a predetermined time is predicted from changes in the voltage frequency per layer of cell in the auxiliary stack and changes in the current in the auxiliary stack, and from the temperature of the auxiliary stack, and at least one of the air supply to the carbon monoxide-selective oxidizing portion and the temperature of the carbon monoxide-selective oxidizing portion is controlled in response to the predicted change in concentration of carbon monoxide.

DETAILED DESCRIPTION OF THE PREFERRED EMBODIMENTS

Embodiment 1

Figure 1:
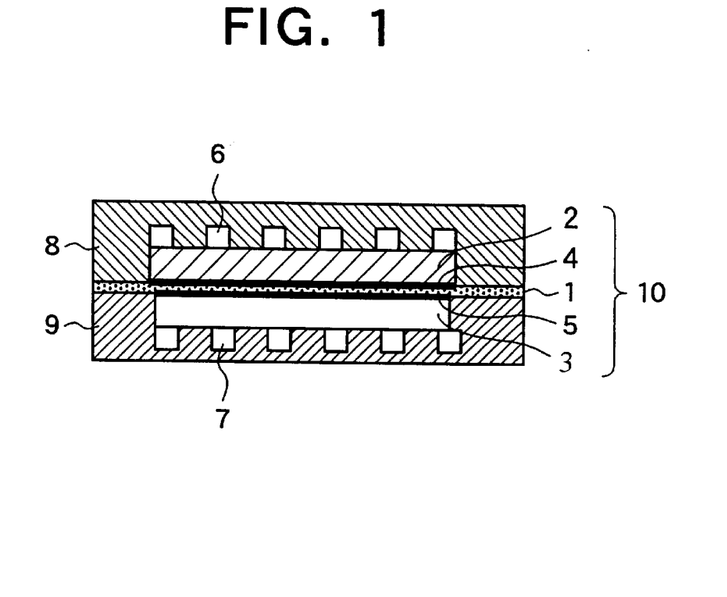
FIG. 1 is a cross-section showing the construction of a cell according to Embodiment 1 of the present invention.

Embodiment 1 of the present invention will be explained below with reference to the drawings. FIG. 1 is a schematic cross-section showing the general construction of a cell incorporating a polymer electrolyte fuel cell for use in a fuel cell according to Embodiment 1 of the present invention, and FIG. 2 is a schematic diagram showing a construction of a fuel cell having a main stack and an auxiliary stack according to Embodiment 1 of the present invention.

In FIG. 1, 1 is an ion-conducting solid electrolyte membrane, and, for example, polyperfluorosulfonate membrane may be used. 2 is a gas-diffusing cathode (oxidant electrode) and 3 is a gas-diffusing anode (fuel electrode), and electrically-conductive porous materials such as carbon paper, for example, may be used for these. 4 and 5 are catalytic layers (4 is platinum catalyst; 5 is Pt-Ru catalyst). Each cell comprises an electrolyte membrane 1, electrodes 2, 3, and catalytic layers 4, 5. 8 and 9 are separator plates, and electrically-conductive materials which do not allow gas to pass through, such as carbon sheet, may be used for these. 6 and 7 are gas channels surrounded by the separator plates 8, 9 and the cell 10.

Figure 2:
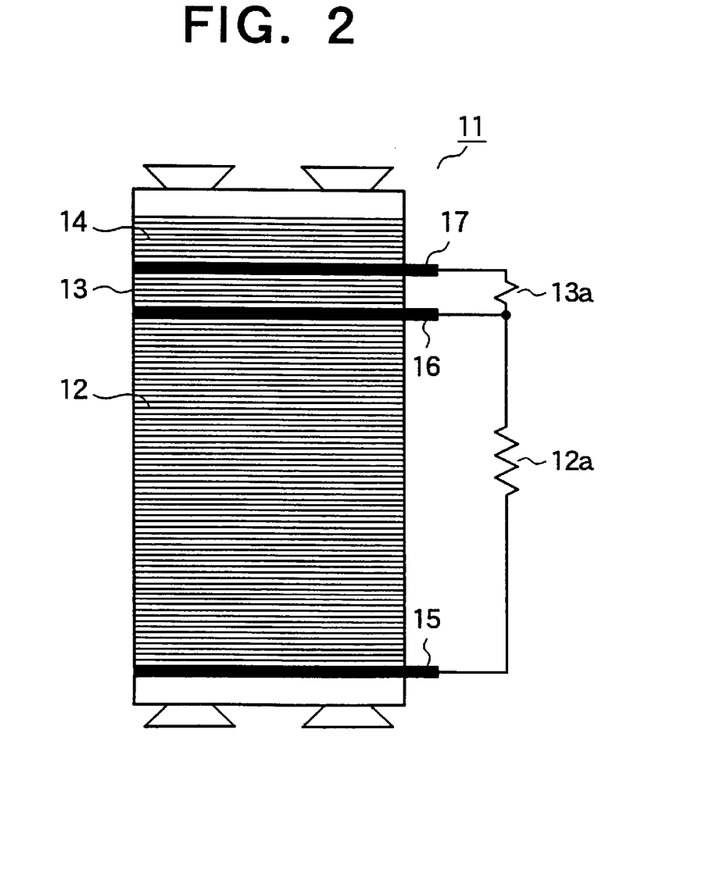
FIG. 2 is a diagram schematically showing a construction of a fuel cell stack module according to Embodiment 1 of the present invention.

In FIG. 2, 11 is a fuel cell stack module, 12 is a fuel cell main stack, 13 is a fuel cell auxiliary stack, 14 is a humidifying portion, and 15 to 17 are current collecting plates. There are fifty cells 10 stacked in the main stack 12 and three cells 10 in the auxiliary stack 13, and air and fuel are supplied from the humidifying portion 14, through the auxiliary stack 13 and main stack 12 in order. Current from the main stack 12 is extracted by current collecting plates 15, 16; current from the auxiliary stack 13 is extracted by current collecting plates 16, 17. Furthermore, 12a and 13a are loads connected between current collecting plates 15 and 16 and between current collecting plates 16 and 17, respectively.

Next, the case where hydrogen is supplied as the fuel will be explained. Air and hydrogen humidified in the humidifying portion 14 are first supplied to the auxiliary stack 13, are distributed over each of the three cells in the auxiliary stack 13, and after generating electric current according to reactions (1) and (2) above, are supplied to the main stack 12 where electric current is generated according to the same reactions.

Figure 3A:
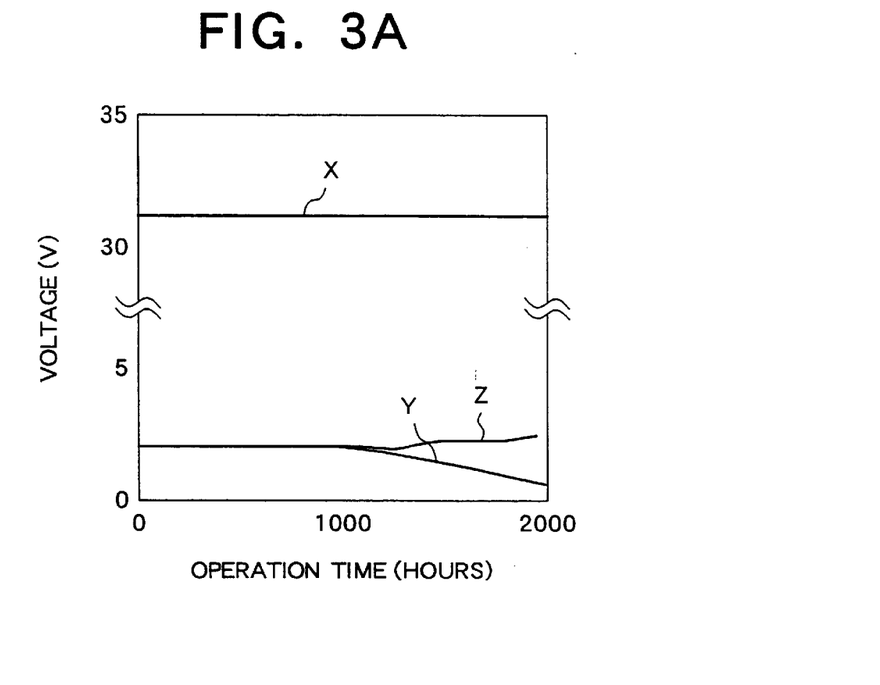
FIG. 3A is a graph showing changes in the voltage of the fuel cell stack module according to Embodiment 1 of the present invention over time.
Figure 3B:
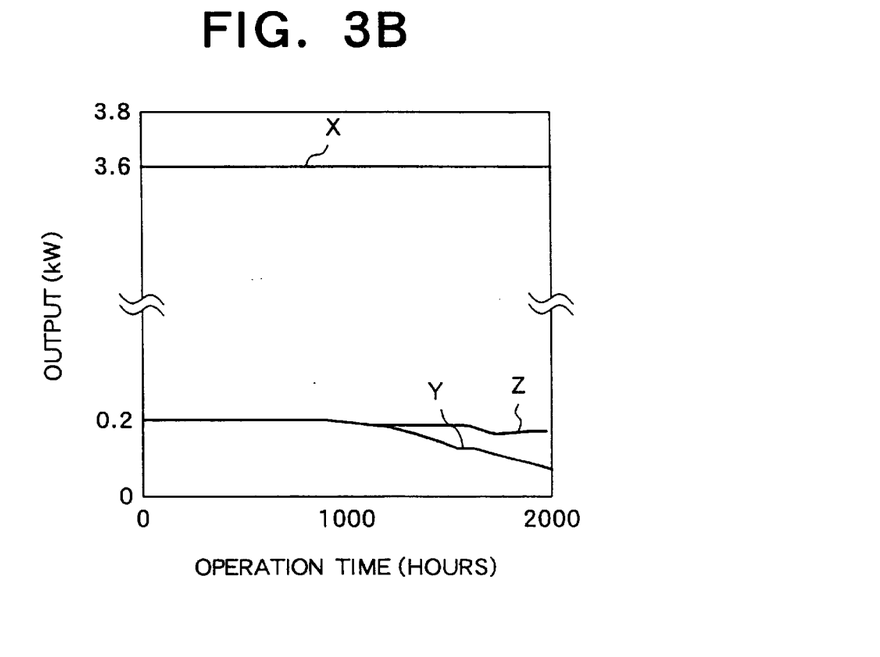
FIG. 3B is a graph showing changes in the output of the fuel cell stack module according to Embodiment 1 of the present invention over time.

FIGS. 3A and 3B show changes in the voltage and the output, respectively, of each portion when electric current is generated. In the figures, X indicates the changes in voltage and output for the main stack, and Y the changes for the auxiliary stack, the changes being for operation at a constant current of 500 mA/cm$^2$ in both cases. In 2000 hours of operation, it was found that the output of the main stack 12 did not change, but the output of the auxiliary stack 13 decreased dramatically. Thus, when the load 13a between current collecting plates 16 and 17 was adjusted so that the current value of the auxiliary stack 13 alone was reduced from part way, decreases in both voltage and output were minimized, as indicated by Z in the figure.

In addition, when the auxiliary stack 13 was analyzed after such operation, metal from piping materials, such as iron, chrome, etc., and metal ions, such as calcium, sodium, etc., were detected, and it was found that impurities from the supplied gas had accumulated in the electrolyte membrane, increasing resistance and reducing performance. However, when the cells in the auxiliary stack 13 alone were changed every 1500 hours, no deterioration in performance was observed in the main stack 12 or the auxiliary stack 13 even after 5000 hours had lapsed, and high performance was able to be maintained.

In the above manner, according to Embodiment 1, reductions in performance due to impurities from the supplied gas flowing into the main stack 12 are prevented by accumulating the impurities in the auxiliary stack 13 and removing them. Furthermore, reductions in output due to the accumulation of impurities in the auxiliary stack 13 can be suppressed by controlling the load.

Consequently, reductions in the performance of a fuel cell due to impurities in the supplied gas can be prevented while suppressing reductions in the current generating efficiency thereof.

Embodiment 2

Next, Embodiment 2 will be explained. The composition of the cell incorporating the polymer electrolyte fuel cell and the construction of the fuel cell stack module are the same as shown for Embodiment 1 in FIGS. 1 and 2, but here reformed simulated methanol gas (75% hydrogen; 25% carbon dioxide) containing 1000 ppm of CO is supplied as the fuel.

Air and simulated reformed methanol gas humidified in the humidifying portion 14 are first supplied to the auxiliary stack 13, are distributed over each of the three cells in the auxiliary stack 13, and after generating electric current according to reactions (1) and (2) above, are supplied to the main stack 12 where electric current is generated according to the same reactions.

In Embodiment 2, the load 13a on the auxiliary stack 13 is controlled such that the voltage per layer of cell in the auxiliary stack 13 continuously oscillates so that the electric potential of the anodes of the auxiliary stack 13 exceeds the electric potential of the oxidation of carbon monoxide.

Figure 4:
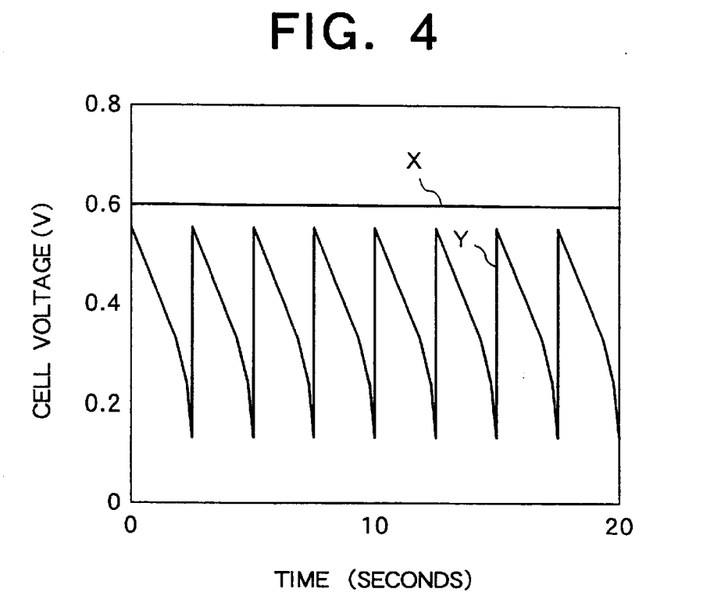
FIG. 4 is a graph showing changes in the voltage per cell in each of the stacks of a fuel cell according to Embodiment 2 of the present invention.

FIG. 4 shows changes in the voltage of both the main stack 12 and the auxiliary stack 13 over time (20 seconds), when electric current was generated at a constant current of 500 mA/cm$^2$, X in the graph indicating the changes in voltage for the main stack 12, and Y the changes in voltage for the auxiliary stack 13. The voltage Y in the auxiliary stack 13 oscillates at an amplitude of 0.4 V per cell (0.18 to 0.58 V) with a period of 3 seconds, but the voltage of the main stack 12 is 0.6 V per cell without any oscillation, and it was possible to obtain a stable direct current voltage of 30 V even though the supplied fuel had a high 1000 ppm carbon monoxide concentration. At that time, the concentration of carbon monoxide at the entrance to the auxiliary stack 13 was 1000 ppm, but the concentration of carbon monoxide at the entrance to the main stack 12 was reduced to 100 ppm. This is considered to be because the carbon monoxide in the fuel adsorbs onto the catalyst of the fuel electrode and is dissociated by reaction (6) below when the electric potential of the anode reaches the electric potential of oxidation of carbon monoxide as the voltage of the auxiliary stack 13 oscillates.

$$CO+H_2O \rightarrow CO_2+2H^++2e^- \qquad (6)$$

At that time, carbon monoxide reacts with the surrounding water and forms carbon dioxide and hydrogen ions, but the hydrogen ions can reach the cathode side and be used in the fuel cell reaction (2) above.

In this manner, according to Embodiment 2, carbon monoxide reacts with water in the auxiliary stack 13 to produce carbon dioxide and hydrogen ions, providing additional hydrogen ions by this reaction which can be used in the fuel cell reaction without wasting hydrogen in the fuel as in Japanese Patent Laid-Open No HEI 7-105967.

Consequently, reductions in the performance of a fuel cell due to carbon monoxide in the supplied gas can be prevented while suppressing reductions in the current generating efficiency thereof.

Embodiment 3

Embodiment 3 will now be explained. The construction of the stack module and the gas supply conditions are generally the same as for Embodiment 2, but in Embodiment 3 the amount of water flowing through coolant water piping (not shown) is adjusted so that the temperature during current generation is 80° C. in the main stack 12 (strictly speaking, the temperature of the separator plates located in the middle of the stack module, for example), and 60° C. in the auxiliary stack 13 (again, the temperature of the separator plates).

Figure 5:
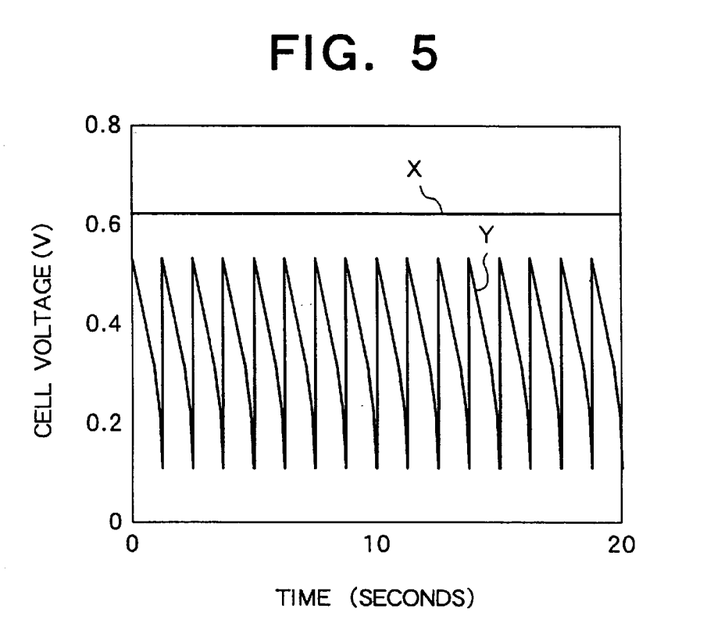
FIG. 5 is a graph showing changes in the voltage per cell in each of the stacks of a fuel cell according to Embodiment 3 of the present invention.

Next, the operation will be explained. FIG. 5 shows changes in the voltage of both the main stack and the auxiliary stack over time (20 seconds), when electric current was generated at a constant current with a current density of 500 mA/cm$^2$, X in the graph indicating the changes in voltage for the main stack, and Y the changes in voltage for the auxiliary stack. The voltage Y in the auxiliary stack 13 oscillated at an amplitude of 0.4 V per cell (0.1 to 0.5 V) with a period of 1.5 seconds, but the voltage of the main stack 12 was 0.62 V per cell without any oscillation, and it was possible to obtain a stable direct current voltage of 31 V. At that time, the concentration of carbon monoxide at the entrance to the auxiliary stack 13 was 1000 ppm, but at 50 ppm the concentration of carbon monoxide at the entrance to the main stack 12 was significantly reduced compared to Embodiment 1 where the temperature of the main stack 12 and the auxiliary stack 13 was not altered It was found that carbon monoxide generally adsorbs more readily when the temperature is low, much of the carbon monoxide in the fuel adsorbing in the auxiliary stack 13 where the temperature is low and the efficiency of the dissociation of carbon monoxide as the voltage oscillates is increased.

Moreover, the temperatures of the main stack 12 and the auxiliary stack 13 are determined by the electrolyte membrane, the type of catalyst, etc., but the main stack 12 should be set at the optimum temperature for current generating efficiency and the auxiliary stack 13 should be set at a lower temperature.

Embodiment 4

Next, Embodiment 4 of the present invention will be explained. Embodiment 4 relates to a fuel cell system comprising a reformer provided with a carbon monoxide-selective oxidizing portion and disposed at a stage prior to the fuel cell shown in FIG. 2, for example.

When the load varies, the concentration of carbon monoxide at the exit of the reformer changes due to changes in temperature within the reformer, etc., but in this embodiment variations in the concentration of carbon monoxide are suppressed and wastage of hydrogen is prevented by controlling the air supply to the carbon monoxide-selective oxidizing portion at an appropriate amount in response to changes in the concentration of carbon monoxide.

Figure 6:
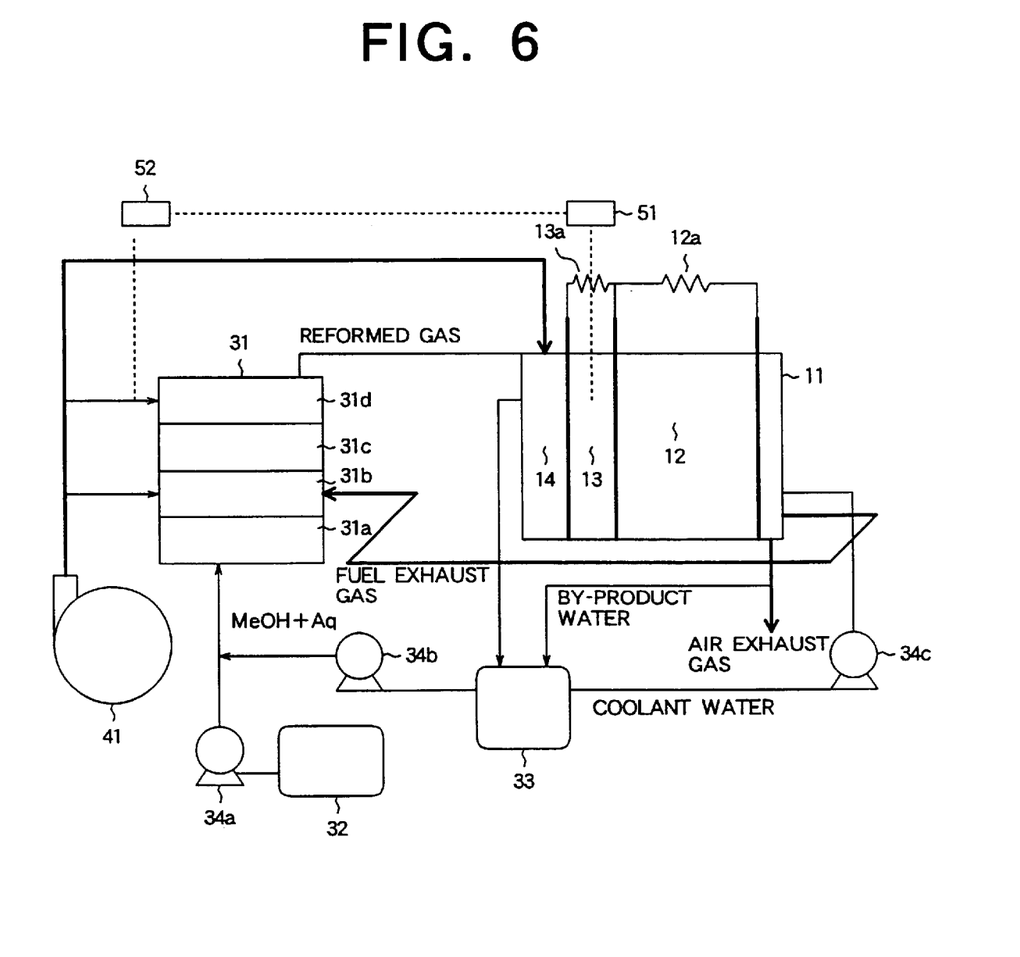
FIG. 6 is a diagram showing a construction of a fuel cell system according to Embodiment 4 of the present invention.

FIG. 6 is a block diagram showing the construction of a fuel cell system comprising a methanol reformer provided with a carbon monoxide-selective oxidation vessel according to Embodiment 4 of the present invention. In the figure, 31 is the methanol reformer, which is provided with a vaporizing portion 31a, a catalytic combustion portion 31b, a reforming portion 31c, and a carbon monoxide-selective oxidizing portion 31d. 32 is a methanol tank, 33 is a water tank, 34a to 34c are pumps, and 41 is an air blower. Furthermore, 51 is a computing portion for storing the relation shown in FIG. 7 (which will be discussed later) as a table and estimating the concentration of carbon monoxide from the frequency of the voltage, and the temperature, etc., of the auxiliary stack 13, and 52 is a control portion for controlling the air supply to the carbon monoxide-selective oxidizing portion 31d of the reformer 31 based on the results calculated by the computing portion 51, the computing portion 51 and the control portion 52 being comprised in a microcomputer. Moreover, the construction of the stack module 11 is identical to that of Embodiment 1.

The following reactions occur in the reformer 31. Water and methanol conveyed by pumps 34a, 34b are vaporized in the vaporizing portion 31a and conveyed to the reforming portion 31c where hydrogen and carbon dioxide are produced by reaction (3) above, but because 1 or 2 percent of carbon monoxide is simultaneously produced by the above shift reaction (4), trace portions of air are introduced into the carbon monoxide-selective oxidizing portion 31d by the air blower 41 to selectively oxidize and remove carbon monoxide, and the fuel is supplied to the fuel cell 11 after the concentration of carbon monoxide has been reduced to around 50 ppm.

Moreover, in the catalytic combustion portion 31b, fuel exhaust gas from the fuel cell 11 and air are reacted by catalytic combustion to supply the heat required in the vaporizing portion 31a and the reforming portion 31c. For that reason, when fluctuations occur in the load, the heat balance may break down and the temperature may change.

Figure 7:
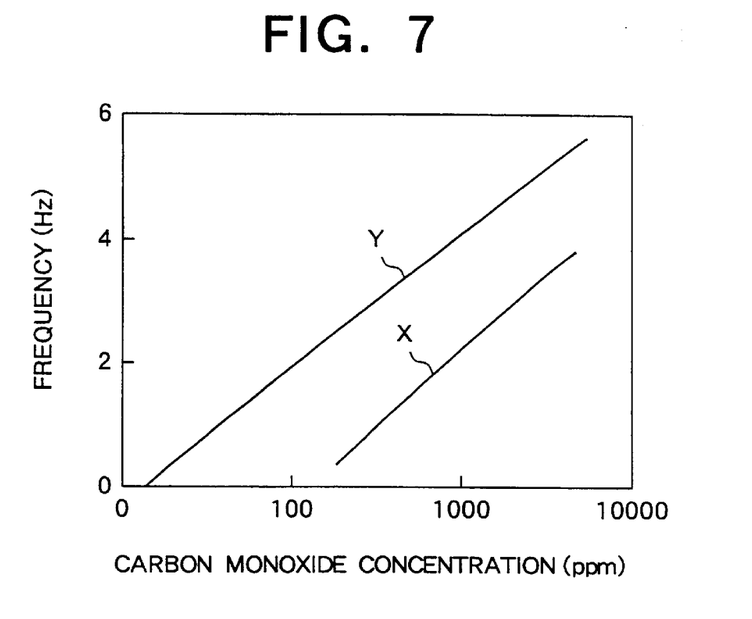
FIG. 7 is a graph showing the relationship between the concentration of carbon monoxide in the fuel and the voltage frequency according to Embodiment 4 of the present invention.

FIG. 7 is a graph showing the relationship between the concentration of carbon monoxide in the fuel and the voltage frequency in the auxiliary stack 13 during current generation at a constant current of 500 mA/cm$^2$, X indicating a temperature of 80° C., and Y a temperature of 60° C. It can be seen from the graph that the voltage frequency increases as the concentration of carbon monoxide rises, or as the operating temperature falls. It is clear that if the operating temperature and frequency are known, the concentration of carbon monoxide being supplied can be inferred. Still, the relationship in FIG. 7 may differ depending on the current.

Figure 8:
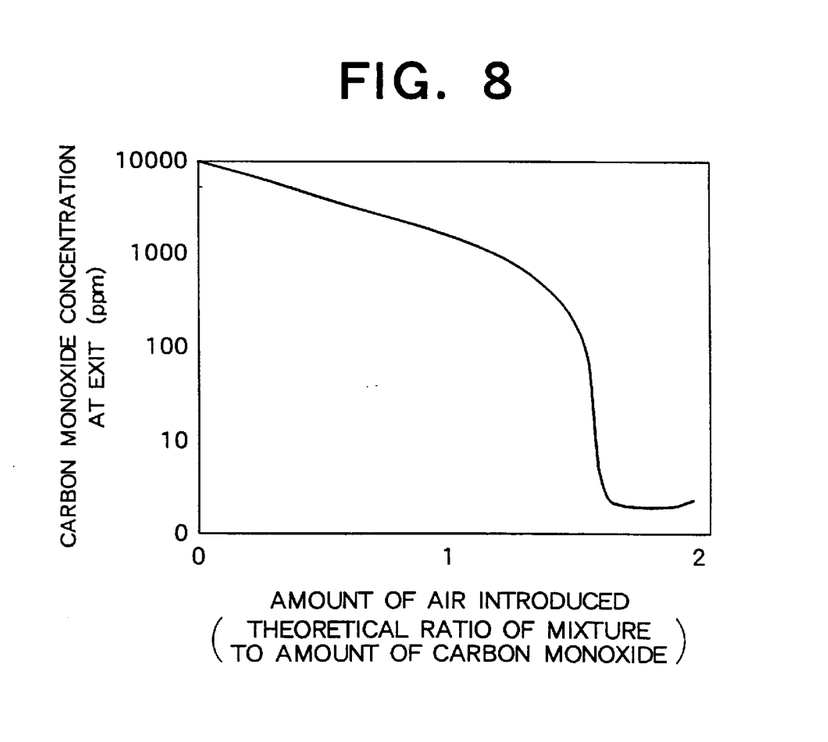
FIG. 8 is a graph showing the relationship between the air supply to the carbon monoxide-selective oxidizing portion and the concentration of carbon monoxide at the exit according to Embodiment 4 of the present invention.
Figure 9:
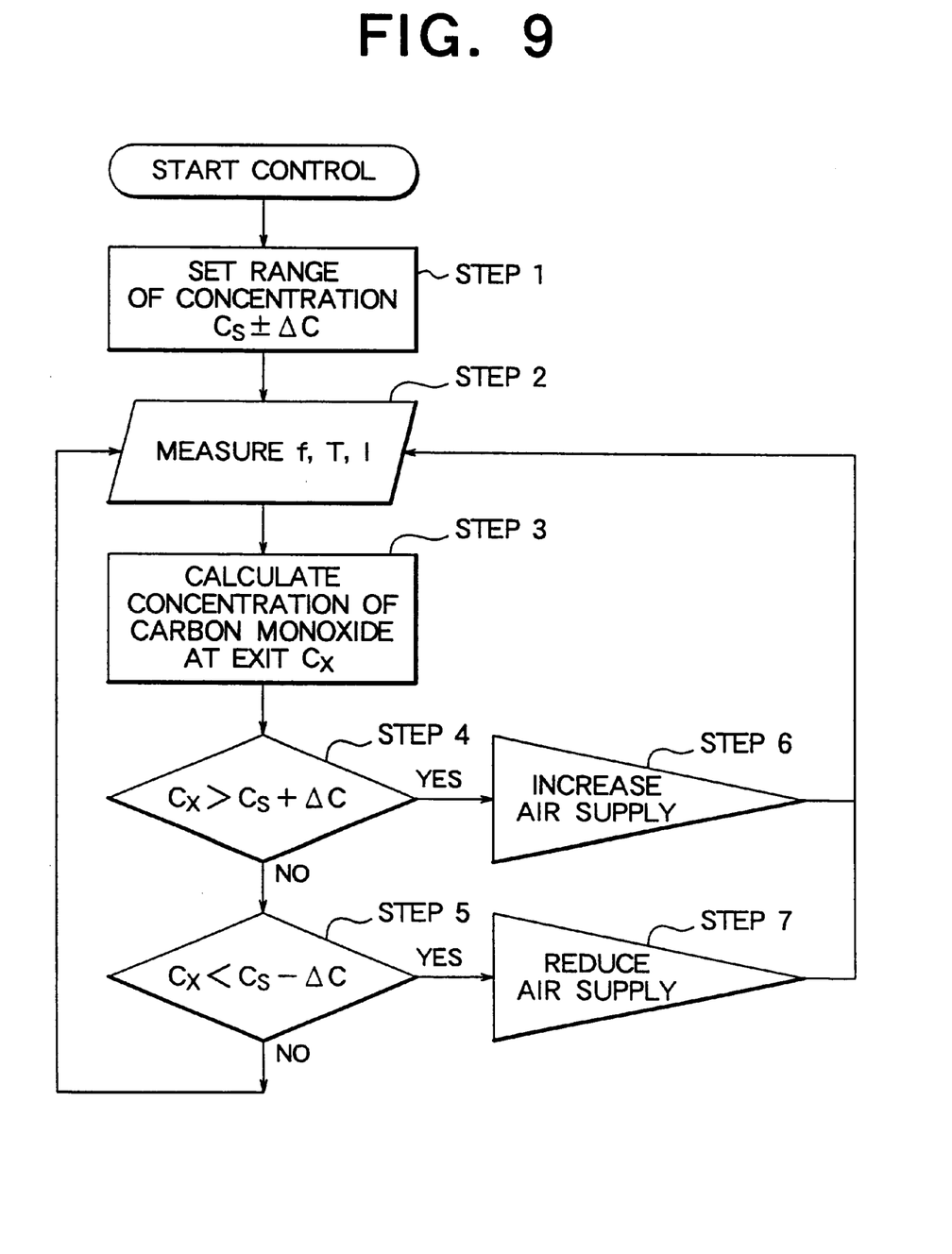
FIG. 9 is a flow chart explaining the control operation according to Embodiment 4 of the present invention.

Furthermore, FIG. 8 is a graph showing the relationship between the amount of air introduced and the concentration of carbon monoxide in the carbon monoxide-selective oxidizing portion 31d of the reformer, and it can be seen from the graph that the concentration of carbon monoxide can be reduced by increasing the amount of air introduced, but if too much air is introduced, hydrogen is consumed, making it necessary to set the amount of air introduced to an appropriate value in response to the state of the fuel FIG. 9 is a flow chart for controlling the air supply to the carbon monoxide-selective oxidizing portion 31d in order to control variations in the concentration of carbon monoxide at the exit of the reformer 31 according to Embodiment 4 of the present invention, and the processing thereof is performed by the computing portion 51.

Normally, the amount of air in the carbon monoxide-selective oxidizing portion of the reformer 31 is adjusted in response to the amount of fuel flowing, but the concentration of carbon monoxide at the exit of the reformer 31 may change due to changes in temperature within the reformer 31, etc. Thus, in this embodiment in addition to the amount of fuel flowing, the concentration of carbon monoxide at the exit of the reformer 31, that is, the concentration of carbon monoxide supplied to the fuel cell 11 is also considered, and the air supply to the carbon monoxide-selective oxidizing portion 31d is controlled by the following steps:

Step 1. Set the concentration of carbon monoxide (Cs) in the fuel to be supplied to the fuel cell 11 and the allowable variation ($\Delta C$). In this embodiment, the set value (Cs) was 50 ppm and the allowable variation ($\Delta C$) was 25 ppm. These values were deduced from the maximum value of carbon monoxide not reducing fuel cell performance, from the carbon monoxide-removal efficiency in the selective oxidizing portion not increasing the consumption of hydrogen in the carbon monoxide-selective oxidizing portion 31d to an extreme, and from control precision, but the values may be modified appropriately in response to the characteristics of the equipment;

Step 2. Measure the voltage frequency (f) of the auxiliary stack 13, the operating temperature (T) of the auxiliary stack 13, and the current (I) in the auxiliary stack 13;

Step 3. Estimate the concentration of carbon monoxide (Cx) in the fuel supplied to the fuel cell from the above parameters, that is, the voltage frequency (f), the operating temperature (T), and the current (I), based on FIG. 7 by means of the computing portion 51;

Step 4. Compare the estimated concentration of carbon monoxide (Cx) with the allowable value (Cs+$\Delta C$). If greater than the allowable value (Cs+$\Delta C$), proceed to Step 6 in order to prevent reduction of the performance of the fuel cell. If not greater proceed to step 5;

Step 5. Compare the estimated concentration of carbon monoxide (Cx) with the lower limit (Cs−$\Delta C$). If less than the lower limit (Cs−$\Delta C$) proceed to Step 7 in order to suppress excessive consumption of hydrogen in the carbon monoxide-selective oxidizing portion 31d. If greater than or equal to the lower limit return to Step 2;

Step 6. Increase the amount of air being supplied to the carbon monoxide-selective oxidizing portion 31d by means of the control portion 52; and Step 7. Reduce the air supply to the carbon monoxide-selective oxidizing portion 31d by means of the control portion 52.

As explained above, when the load varies, the concentration of carbon monoxide at the exit of the reformer 31 changes due to changes in temperature within the reformer 31, etc. Consequently, the concentration of carbon monoxide in the fuel supplied to the current generating portion of the fuel cell 11 changes, but before performing correctional control, the variation was as large as 400 percent (250 ppm) on the plus side and 80 percent (10 ppm) on the minus side for a set value of 50 ppm, whereas by performing the correctional control according to this embodiment, it was possible to suppress the variation in the concentration of carbon monoxide to within 100 percent (100 ppm) on the plus side, and to within 50 percent (25 ppm) on the minus side.

Thus, system efficiency was improved by stabilizing cell voltage and improving the current generating efficiency as well as suppressing excessive fuel consumption.

Moreover, in Embodiment 4, the air supply was controlled, but changes in the concentration of carbon monoxide in the fuel supplied to the fuel cell can similarly be controlled by adjusting the temperature of the carbon monoxide-selective oxidizing portion 31d, that is, by reducing the temperature when the concentration of carbon monoxide is high, and increasing the temperature when the concentration of carbon monoxide is low.

Moreover, both the air supply and the temperature may be controlled.

Furthermore, in Embodiment 4, the concentration of carbon monoxide (Cx) in the fuel supplied to the fuel cell was estimated from the voltage frequency (f), the operating temperature (T), and the current (I) of the auxiliary stack 13 based on FIG. 7, but the voltage frequency (f), the operating temperature (T), and the current (I) do not all have to be measured, for example, the operating temperature does not have to be measured. In other words, the auxiliary stack 13 and the main stack 12 vary in the same way within a certain range, and the allowable concentration of carbon monoxide also varies according to that temperature. Consequently, adjustment of the concentration of carbon monoxide appropriate to the main stack 12 is not hindered even if the actual concentration of carbon monoxide is not known.

Embodiment 5

Next, the fuel cell system according to Embodiment 5 of the present invention will be explained. The overall construction of the system is the same as shown in FIG. 6.

Figure 10:
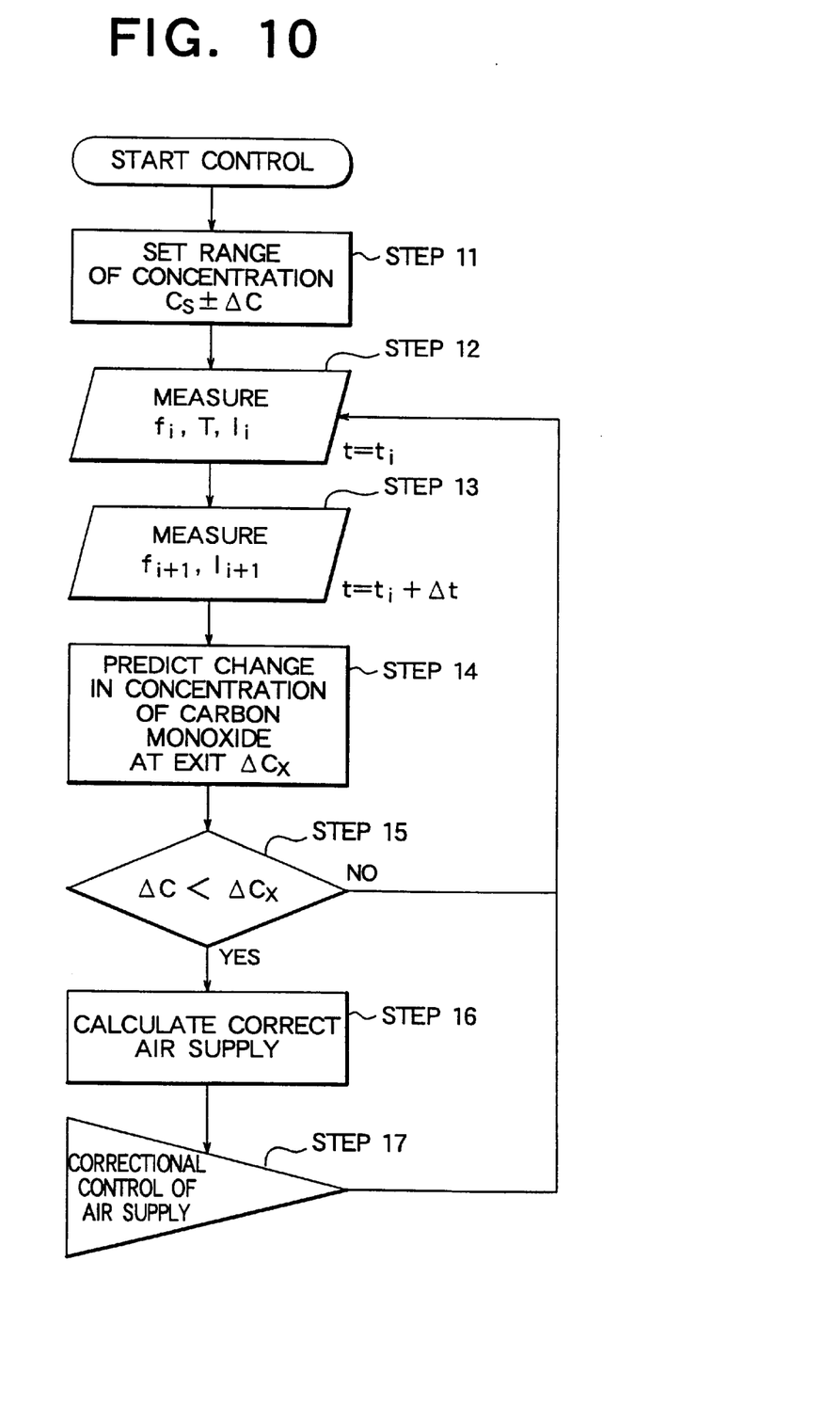
FIG. 10 is a flow chart explaining the control operation according to Embodiment 5 of the present invention.

FIG. 10 is a flow chart for correcting and controlling the air supply to the carbon monoxide-selective oxidizing portion in order to maintain the concentration of carbon monoxide at the exit of the reformer at a constant level according to Embodiment 5 of the present invention.

In this embodiment, changes in the concentration of carbon monoxide supplied to the fuel cell 11 are predicted, and the air supply to the carbon monoxide-selective oxidizing portion 31d is optimally controlled by the following steps:

Step 11. Set the concentration of carbon monoxide (Cs) in the fuel to be supplied to the fuel cell 11 and the allowable variation ($\Delta C$). In this embodiment, the set value (Cs) was 50 ppm and the allowable variation ($\Delta C$) was 15 ppm. It was possible to narrow the allowable variation in this manner because advanced control was used, improving the control precision compared to the control according to Embodiment 4 above, and it is possible to modify the allowable variation in response to the characteristics of the equipment;

Step 12. Measure the voltage frequency ($f_i$) of the auxiliary stack 13, the operating temperature (T) of the auxiliary stack 13, and the current ($I_i$) at time $t=t_i$;

Step 13. Measure the voltage frequency ($f_{i+1}$) and the current ($I_{i+1}$) of the auxiliary stack 13 in the next instant $t=t_i+\Delta t$ (0.3 seconds later in this embodiment). The temperature ($T_{i+1}$) was not measured because it does not change instantaneously;

Step 14. Estimate the amount of change in the concentration of carbon monoxide in the fuel supplied to the fuel cell in the period from $t=t_i$ to $t=t_i+\Delta t$ from the above parameters, that is, the voltage frequencies ($f_i$, $f_{i+1}$), the operating temperature (T), and the currents ($I_i$, $I_{i+1}$) of the auxiliary stack 13, using the relationship in FIG. 7 by means of the computing portion 51, and predict the amount of change in the concentration of carbon monoxide ($\Delta Cx$) a predetermined time later (1.5 seconds later in this embodiment). Here, the time settings may be modified appropriately in response to the construction of the system because they depend on the time taken from when the air supply to the carbon monoxide-selective oxidizing portion 31d is changed until the change in the concentration of carbon monoxide in the supplied gas becomes apparent and on the allowable variation therefor;

Step 15. Compare the amount of change in the concentration of carbon monoxide ($\Delta Cx$) a predetermined time (1.5 seconds) later predicted in Step 14 with the allowable variation ($\Delta C$). If the change ($\Delta Cx$) is greater than the allowable variation ($\Delta C$), proceed to Step 16. If it is not greater return to step 12;

Step 16. Calculate the correct air supply in response to the amount of change in the concentration of carbon monoxide 1.5 seconds later predicted in Step 14; and Step 17. Correct the air supply in response to the correct air supply obtained in Step 16. In other words, when the concentration of carbon monoxide increases and exceeds the allowable variation ($\Delta C$), increase the air supply to the carbon monoxide-selective oxidizing portion 31d in order to prevent reductions in the performance of the fuel cell. When the concentration of carbon monoxide decreases and exceeds the allowable variation ($\Delta C$), reduce the air supply to the carbon monoxide-selective oxidizing portion 31d in order to suppress excessive consumption of hydrogen in the carbon monoxide-selective oxidizing portion 31d.

In the above manner, in Embodiment 5, the concentration of carbon monoxide is controlled to within plus or minus 30 percent (50±15 ppm) by predicting the change in the concentration of carbon monoxide after a predetermined time (1.5 seconds) from the change in the voltage frequency in the auxiliary stack 13 over a 0.3 second interval and controlling the air supply before the concentration of carbon monoxide changes.

Thus, system efficiency is greatly improved by stabilizing cell voltage and improving the current generating efficiency even more than Embodiment 4 as well as suppressing excessive fuel consumption.

Moreover, in Embodiment 5, the air supply was controlled, but the temperature of the reformer 31 may be controlled, or alternately, both the air supply and the temperature may be controlled.

Further, in Embodiment 5, the amount of change in the concentration of carbon monoxide ($\Delta Cx$) after predetermined time was predicted, but the concentration of carbon monoxide after predetermined time may be predicted. In this case, the air supply is able to be controlled by the steps 3 to 7 of FIG. 9 explained in Embodiment 4.

Furthermore, in Embodiment 5, the amount of change in the concentration of carbon monoxide ($\Delta Cx$) in the fuel supplied to the fuel cell was estimated from the voltage frequency (f), the operating temperature (T), and the current (I) of the auxiliary stack 13 based on FIG. 7, but the voltage frequency (f), the operating temperature (T), and the current (I) do not all have to be measured, for example, the operating temperature does not have to be measured. In other words, the auxiliary stack 13 and the main stack 12 vary in the same way within a certain range, and the allowable concentration of carbon monoxide also varies according to that temperature. Consequently, adjustment of the concentration of carbon monoxide appropriate to the main stack 12 is not hindered even if the actual concentration of carbon monoxide is not known.

In the above manner, according to the first construction of the present invention, there is provided a polymer electrolyte fuel cell comprising:

a main stack alternately stacked with cells each provided with gas-diffusing electrodes on both sides of an ion-conducting electrolyte membrane and gas separators for supplying fuel to one of the electrodes and oxidant gas to the other electrode on each of the cells; and an auxiliary stack alternately stacked with the cells and the gas separators, the auxiliary stack having a lesser number of cells and gas separators than the main stack and having an independent current path from the main stack, wherein the fuel and the oxidant gas are supplied to the main stack after passing through the auxiliary stack, and wherein the load on the auxiliary stack is controlled, enabling the prevention of reductions in performance due to poisoning of the catalyst while suppressing reductions in the current generating efficiency of the fuel cell.

According to a second construction of the present invention, in addition to the first construction, the load on the auxiliary stack of a polymer electrolyte fuel cell may also be controlled such that the voltage per layer of cell in the auxiliary stack continuously oscillates so that the electric potential of the fuel electrodes of the auxiliary stack exceeds the electric potential of the oxidation of carbon monoxide, enabling carbon monoxide to be removed from the fuel while suppressing wastage of hydrogen in the auxiliary stack, and also enabling the prevention of reductions in performance due to carbon monoxide in the supplied gas while suppressing reductions in the current generating efficiency of the fuel cell.

According to a third construction of the present invention, the temperature of the auxiliary stack of a polymer electrolyte fuel cell may also be reduced below the temperature of the main stack, further improving the removal of carbon monoxide in the auxiliary stack.

According to a fourth construction of the present invention, there is provided a polymer electrolyte fuel cell system comprising: the polymer electrolyte fuel cell according to either the second or third construction above; and a reformer disposed at a stage prior to the polymer electrolyte fuel cell, the reformer being provided with a reforming portion for reforming hydrocarbons into a fuel having hydrogen as its main component and a carbon monoxide-selective oxidizing portion for oxidizing carbon monoxide in the fuel by supplying air thereto, wherein the concentration of carbon monoxide in the fuel supplied to the auxiliary stack is estimated from at least one of the current in the auxiliary stack, the temperature of the auxiliary stack, and the voltage frequency per layer of cell in the auxiliary stack, and at least one of the air supply to the carbon monoxide-selective oxidizing portion and the temperature of the carbon monoxide-selective oxidizing portion is controlled in response to the estimated concentration of carbon monoxide, enabling the concentration of carbon monoxide at the exit of the reformer to be ascertained accurately and variations in the concentration of carbon monoxide supplied to the auxiliary stack to be suppressed by appropriate carbon monoxide-selective oxidation, also enabling the cell voltage to be stabilized and current generating efficiency to be improved as well as suppressing excessive fuel consumption, and also enabling system efficiency to be improved.

According to a fifth construction of the present invention, there is provided a polymer electrolyte fuel cell system comprising: the polymer electrolyte fuel cell according to either the second or third construction above; and a reformer disposed at a stage prior to the polymer electrolyte fuel cell, the reformer being provided with a reforming portion for converting hydrocarbons into a fuel having hydrogen as its main component and a carbon monoxide-selective oxidizing portion for oxidizing carbon monoxide in the fuel by supplying air thereto, wherein the change in concentration of carbon monoxide in the fuel supplied to the auxiliary stack after a predetermined time is predicted from changes in the voltage frequency per layer of cell in the auxiliary stack and changes in the current in the auxiliary stack, and from the temperature of the auxiliary stack, and at least one of the air supply to the carbon monoxide-selective oxidizing portion and the temperature of the selective oxidizing portion is controlled in response to the predicted change in concentration of carbon monoxide, enabling the change in concentration of carbon monoxide at the exit of the reformer to be ascertained accurately and variations in the concentration of carbon monoxide supplied to the auxiliary stack to be suppressed by appropriate carbon monoxide-selective oxidation, also enabling the cell voltage to be stabilized and the current generating efficiency to be improved as well as suppressing excessive fuel consumption, and also enabling system efficiency to be improved.

What is claimed is:

1. A polymer electrolyte fuel cell comprising:

a plurality of cells alternately stacked and each having an ion-conducting electrolyte membrane, a first gas-diffusing electrode on a first surface of said ion-conducting electrolyte membrane, a second gas-diffusing electrode on a second surface of said ion-conducting electrolyte membrane and a plurality of gas separators configured to supply fuel to said first gas-diffusing electrode and oxidant gas to said second gas-diffusing electrode;

a main stack including ones of said plurality of cells; and an auxiliary stack including other ones of said plurality of cells and a current path with a load independent from said main stack, wherein;

said ones of said plurality of cells in said main stack comprise a larger number of cells than said other ones of said plurality of cells in said auxiliary stack;

said main stack and said auxiliary stack are connected such that said fuel and said oxidant gas are supplied to said ones of said plurality of cells in said main stack after passing through said other ones of said plurality of cells in said auxiliary stack; and the load in said current path for said auxiliary stack is configured to vary.

2. The polymer electrolyte fuel cell according to claim 1, wherein said load in said current path for said auxiliary stack is controlled such that a voltage per layer of cell in said auxiliary stack continuously oscillates so that an electric potential of one of said first and second gas diffusing electrodes in said auxiliary stack exceeds the electric potential for oxidation of carbon monoxide.

3. The polymer electrolyte fuel cell according to claim 2, wherein said auxiliary stack has a lower temperature than said main stack.

4. The polymer electrolyte fuel cell according to claim 2, further comprising:
   a reformer including a reforming device positioned and configured to reform hydrocarbons into the fuel and a carbon monoxide-selective oxidizing device positioned and configured to oxidize carbon monoxide in said fuel by supplying air thereto,
   wherein;
   a concentration of carbon monoxide in said fuel supplied to said auxiliary stack is determined based on at least one of a current in said auxiliary stack, a temperature of said auxiliary stack, and a voltage frequency per layer of cell in said auxiliary stack; and
   at least one of the air supplied to said carbon monoxide-selective oxidizing device and a temperature of said carbon monoxide-selective oxidizing device is controlled in response to said concentration of carbon monoxide.

5. The polymer electrolyte fuel cell according to claim 4, wherein the temperature of said auxiliary stack of said polymer electrolyte fuel cell is reduced below the temperature of said main stack thereof.

6. A polymer electrolyte fuel cell according to claim 2, further comprising:
   a reformer including a reforming device positioned and configured to reform hydrocarbons into the fuel and a carbon monoxide-selective oxidizing device positioned and configured to oxidize carbon monoxide in said fuel by supplying air thereto,
   wherein:
   change in a concentration of carbon monoxide in said fuel supplied to said auxiliary stack after a predetermined time is determined from changes in a voltage frequency per layer of cell in said auxiliary stack, changes in a current in said auxiliary stack, and a temperature of said auxiliary stack; and
   at least one of the air supplied to said carbon monoxide-selective oxidizing device and a temperature of said selective oxidizing device is controlled in response to said change in the concentration of carbon monoxide.

7. The polymer electrolyte fuel cell system according to claim 6, wherein the temperature of said auxiliary stack of said polymer electrolyte fuel cell is reduced below the temperature of said main stack thereof.

8. A polymer electrolyte fuel cell system, comprising:
   a polymer electrolyte fuel cell having a plurality of cells alternately stacked, a main stack including ones of said plurality of cells, and an auxiliary stack including other ones of said plurality of cells and a current path with a load independent from said main stack, said plurality of cells each having an ion-conducting electrolyte membrane, a first gas-diffusing electrode on a first surface of said ion-conducting electrolyte membrane, a second gas-diffusing electrode on a second surface of said ion-conducting electrolyte membrane and a plurality of gas separators configured to supply fuel to said first gas-diffusing electrode and oxidant gas to said second gas-diffusing electrode, said ones of said plurality of cells in said main stack having a larger number of cells than said other ones of said plurality of cells in said auxiliary stack, said main stack and said auxiliary stack being connected such that the fuel and the oxidant gas are supplied to said ones of said plurality of cells in said main stack after passing through said other ones of said plurality of cells in said auxiliary stack, said load in said current path for said auxiliary stack being configured to vary; and
   a reformer including a reforming device positioned and configured to reform hydrocarbons into the fuel and a carbon monoxide-selective oxidizing device positioned and configured to oxidize carbon monoxide in the fuel by supplying air thereto,
   wherein:
   said load in said current path for said auxiliary stack is controlled such that a voltage per layer of cell in said auxiliary stack continuously oscillates so that an electric potential of one of said first and second gas diffusing electrodes in said auxiliary stack exceeds the electric potential for the oxidation of carbon monoxide;
   a concentration of carbon monoxide in the fuel supplied to said auxiliary stack is determined based on at least one of a current in said auxiliary stack, a temperature of said auxiliary stack, and the voltage frequency per layer of cell in said auxiliary stack; and
   at least one of the air supplied to said carbon monoxide-selective oxidizing device and a temperature of said carbon monoxide-selective oxidizing device is controlled in response to the concentration of carbon monoxide.

9. The polymer electrolyte fuel cell system according to claim 8, wherein said auxiliary stack of said polymer electrolyte fuel cell has a lower temperature than said main stack thereof.

10. A polymer electrolyte fuel cell system, comprising:
    a polymer electrolyte fuel cell having a plurality of cells alternately stacked, a main stack including ones of said plurality of cells, and an auxiliary stack including other ones of said plurality of cells and a current path with a load independent from said main stack, said plurality of cells each having an ion-conducting electrolyte membrane, a first gas-diffusing electrode on a first surface of said ion-conducting electrolyte membrane, a second gas-diffusing electrode on a second surface of said ion-conducting electrolyte membrane and a plurality of gas separators configured to supply fuel to said first gas-diffusing electrode and oxidant gas to said second gas-diffusing electrode, said ones of said plurality of cells in said main stack having a larger number of cells than said other ones of said plurality of cells in said auxiliary stack, said main stack and said auxiliary stack being connected such that the fuel and the oxidant gas is supplied to said ones of said plurality of cells in said main stack after passing through said other ones of said plurality of cells in said auxiliary stack, said load in said current path for said auxiliary stack being configured to vary; and
    a reformer including a reforming device positioned and configured to reform hydrocarbons into the fuel and a carbon monoxide-selective oxidizing device positioned and configured to oxidize carbon monoxide in the fuel by supplying air thereto, wherein:

said load in said current path for said auxiliary stack is controlled such that a voltage per layer of cell in said auxiliary stack continuously oscillates so that an electric potential of one of said first and second gas diffusing electrodes in said auxiliary stack exceeds the electric potential for the oxidation of carbon monoxide;

change in a concentration of carbon monoxide in the fuel supplied to said auxiliary stack after a predetermined time is predicted based on changes in a voltage frequency per layer of cell in said auxiliary stack and changes in a current in said auxiliary stack, and a temperature of said auxiliary stack; and at least one of the air supplied to said carbon monoxide-selective oxidizing device and a temperature of said selective oxidizing device is controlled in response to the change in the concentration of carbon monoxide.

11. The polymer electrolyte fuel cell system according to claim 10, wherein said auxiliary stack of said polymer electrolyte fuel cell has a lower temperature than said main stack thereof.

12. A polymer electrolyte fuel cell, comprising:

a plurality of cells alternately stacked and each including an ion-conducting electrolyte membrane, a first gas-diffusing electrode on a first surface of said ion-conducting electrolyte membrane, a second gas-diffusing electrode on a second surface of said ion-conducting electrolyte membrane and a plurality of gas separators configured to supply fuel to said first gas-diffusing electrode and oxidant gas to said second gas-diffusing electrode;

an auxiliary stack including ones of said plurality of cells and a current circuit with a variable load; and a main stack including other ones of said plurality of cells and connected to said auxiliary stack such that the fuel and the oxidant gas pass through said ones of said plurality of cells in said auxiliary stack before being supplied to said other ones of said plurality of cells in said main stack.

* * * * *